United States Patent [19]

Puech et al.

[11] Patent Number: 5,206,674
[45] Date of Patent: Apr. 27, 1993

[54] SYSTEM FOR THE DISPLAY OF IMAGES GIVEN BY A SPATIAL MODULATOR WITH TRANSFER OF ENERGY

[75] Inventors: Claude Puech, Ballainvilliers; Jean-Pierre Huignard, Paris; Michel Papuchon, Villebons Sur Yvette; Henri Raobenbach, Paris; Brigitte Loiseaux, Villebon Sur Yvette, all of France

[73] Assignee: Thomson-CSF, Puteaux, France

[21] Appl. No.: 786,898

[22] Filed: Nov. 1, 1991

[30] Foreign Application Priority Data

Nov. 9, 1990 [FR] France .............................. 90 13941

[51] Int. Cl.⁵ .............................................. G03B 21/14
[52] U.S. Cl. ..................................... 353/122; 353/31; 353/34; 359/48; 359/11
[58] Field of Search ................... 353/122, 31, 33, 34, 353/37, 30, 29; 359/48, 36, 40, 11, 299, 345, 326, 7, 342, 159, 160

[56] References Cited

U.S. PATENT DOCUMENTS 4,934,779 6/1990 Dunning .

FOREIGN PATENT DOCUMENTS 0383646 8/1990 European Pat. Off. .
2608792 6/1988 France .

Primary Examiner—William A. Cuchlinski, Jr.
Assistant Examiner—William C. Dowling
Attorney, Agent, or Firm—Oblon, Spivak, McClelland, Maier & Neustadt

[57] ABSTRACT

A system for the display of images comprising:
a spatial modulator of light receiving a first light beam and retransmitting a modulated beam;
an energy transfer device receiving the modulated beam and a second light beam and transferring the energy from the second light beam towards the modulated beam.

12 Claims, 3 Drawing Sheets

SYSTEM FOR THE DISPLAY OF IMAGES GIVEN BY A SPATIAL MODULATOR WITH TRANSFER OF ENERGY

BACKGROUND OF THE INVENTION

The invention relates to a system for the display of light images.

It can be applied more particularly to the projection of video images on a wide screen.

Wide-screen video projection systems, based on liquid crystal active matrices are currently being developed. These matrices generally use "nematic helix" type liquid crystals associated with thin layer transistors for the addressing of the different pixels by the video signal. They are the equivalent of dynamic slides. The resultant projectors can be likened to slide projectors by virtue of their design. The color images are obtained either from three monochromatic optic valves or from a single valve provided with filters colored according to an arrangement similar to that of color TV tubes.

These projectors are very attractive in principle but have the drawback of having a very poor light efficiency of a few per cent. For, the cells used make it necessary to work between crossed polarizers which means, firstly, that one of the components of polarization of the illumination source is not used (entailing a 50% loss) and, secondly, that there is an additional absorption due to the polarizers used that has to be taken into account. The useful surface of each pixel is small (because of the distance between each pixel, the area occupied by each transistor etc.) and will be all the smaller as it is sought to set up, for identical cell areas, very high-definition cells compatible with HDTV.

Although contrivances enabling an increase in the light efficiency of such projectors are currently being studied, it is unlikely that it will be possible to make projectors with an efficiency of more than 10%.

In parallel with the use of liquid crystal matrices, trichromatic laser projection based approaches can also be considered. Approaches such as these use methods for the XY deflection of laser beams by optomechanical (including holographic) and acousto-optical methods. These approaches are limited by several factors:
- flickering phenomena (due to the non-remanence of the screen);
- the difficulty of making fast deflectors with a large number of dots while at the same time preserving high efficiency;
- the existence of parasitic phenomena due to speckle noise (related to the coherence of the laser sources used).

The approach proposed is based on the use of liquid crystal matrices (the industrial development of which is inevitable) in a projection system that enables efficient energy transfer between a signal beam and a pump beam.

SUMMARY OF THE INVENTION

This is why the invention relates to a system for the display of images comprising:
- a spatial modulator of light receiving a first light beam and retransmitting a modulated beam;
- an energy transfer device receiving the modulated beam and a second light beam and transferring the energy from the second light beam towards the modulated beam.

BRIEF DESCRIPTION OF THE DRAWINGS

The different objects and characteristics of the invention will appear more clearly from the following description and from the appended figures, of which.

DETAILED DESCRIPTION OF THE INVENTION

The techniques of energy transfer from a pump beam to a signal beam are now well known. They rely inter alia on the use of photorefractive materials (BSO, $BaTiO_3$, SBN etc.).

The proposed approach consists in using this energy transfer effect to overcome the poor efficiency of the standard projector using standard liquid crystal active matrices.

Figure 1:
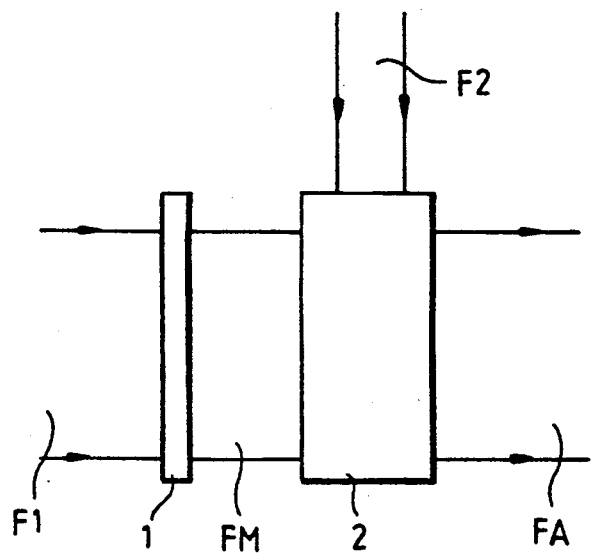
FIG. 1 shows an exemplary embodiment of a system according to the invention.

The general exemplary embodiment of FIG. 1 has a spatial modulator of light 1 receiving a first beam F1 and transmitting a modulated beam FM which thus conveys an image according to the spatial modulation performed. The spatial modulator 1 is for example a liquid crystal cell.

An energy transfer cell 2 such as a non-linear medium, a photoreactive crystal for example, receives the modulated beam FM and a second beam F2 in such a way that an energy transfer takes place from the second beam F2 towards the modulated beam FM. Thus, a highly amplified modulated beam FA to be displayed is obtained. To this end, the two beams F2 and FM have the same wavelength and their angle forms a determined angle according to the nature of the photorefractive material as known in the prior art.

Figure 2:
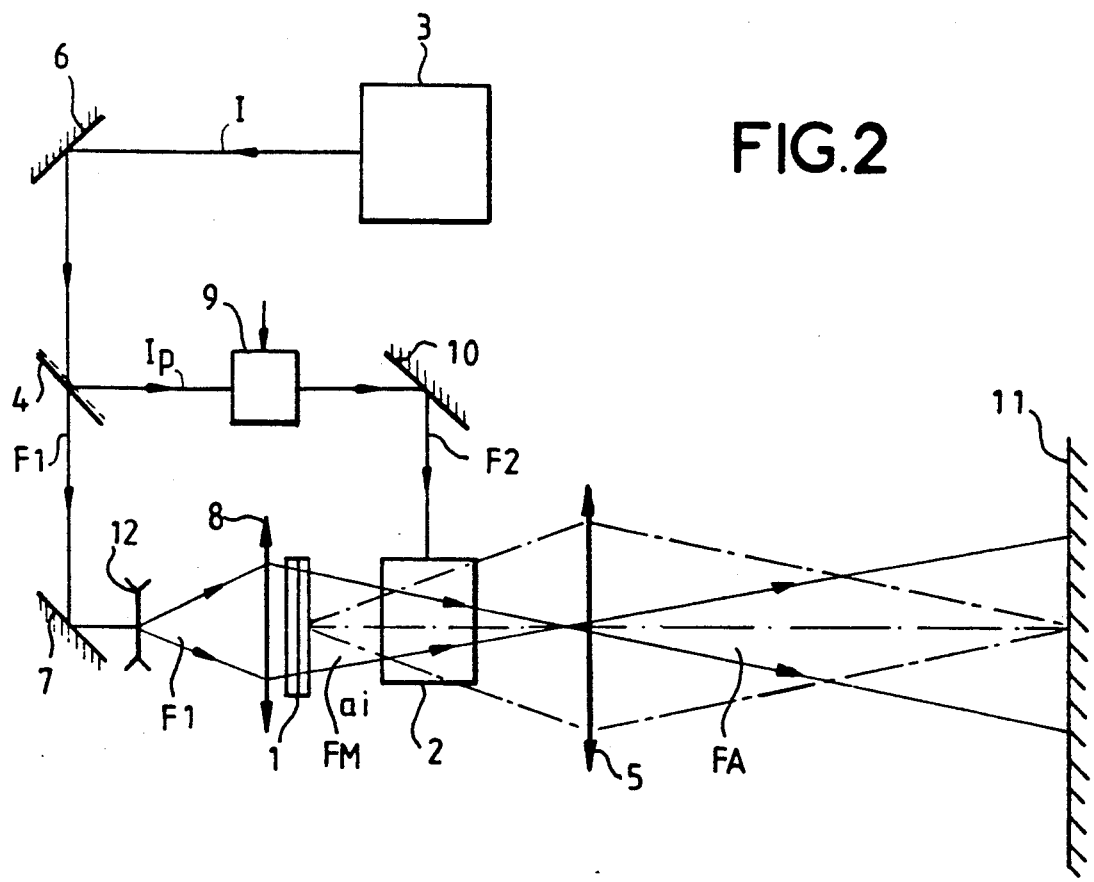
FIG. 2 shows a detailed exemplary embodiment of a system according to the invention.

FIG. 2 shows a detailed exemplary embodiment of the device according to the invention.

This device has essentially:
a polarized light source 3 (laser) emitting a beam F1;
a beam separator 4 separating the beam F1 into a high-intensity beam F2 and a low-intensity beam F1.
a spatial modulator of light 1 such as a liquid crystal screen receiving the low-intensity beam F1 and transmitting a modulated beam FM;
an energy transfer device such as a non-linear medium 2, for example a photorefractive crystal receiving the low-intensity modulated beam FM as well as the high-intensity beam F2 and carrying out an energy transfer from the beam F2 to the beam FM;
an objective 5 enabling the beam FA obtained to be displayed on a screen 11;

The working of this device is therefore as follows:

The radiation coming from the laser 3 is separated into two beams F1 and F2 of unequal intensities i and Ip. The low-intensity F1 is directed towards the liquid crystal matrix so as to illuminate it in a manner similar to that employed in a standard projector (it must be noted that, since the laser can advantageously be polarized, it enables the elimination of the input polarizer of a standard projection system and the gaining of at least three dB on the light balance).

We have already seen why the light efficiency of a liquid crystal projector is low. Let $\alpha$ be this efficiency ($\alpha << 1$). At the output of the optic valve and of the polarizer, the light intensity is therefore ($\alpha.I$).

The beam F2 with high intensity Ip is used as a pump beam in order to amplify the low level beam FM coming from the modulator 1. To do this, the beams FM and F2 having intensities Ip and ($\alpha.i$) are combined in the photorefractive medium 2 (barium titanate crystal for example) so as to transfer the energy from the pump beam F2 to the modulated beam FM. This transfer may be achieved with excellent efficiency if the ratio Ip/($\alpha.i$) is great ($10^3$ for example), if the angles between modulated beam FM and pump beam F2 are accurately adjusted (the gain depends on the pitch of the fringes—this pitch being characteristic of the photorefractive material used—typically some microns for bariyum titanate with an angular passband that is sufficient to amplify a beam having an angular spectrum, like that coming from the valve) and if the signal beam has a density of the intensity of the order of some mW/cm$^2$. The efficiency of the transfer interaction may reach 100% in materials such as BaTiO$_3$ and SBN.

All things being equal besides, it is possible to compare the possible yield $\eta_1$ of a projection system directly using the laser beam with an intensity I in a standard projection system and the yield $\eta_2$ in a projection system according to the invention using the energy transfer method as described here above.

$$\eta_1 = \alpha$$

$$\eta_2 \leq Ip/I = 1 - i/I$$

It being known that ($\alpha.i$) should be of the order of 1 to 10 mW and that the ratio Ip/$\alpha.i \approx 10^3$ (with $\alpha \approx 5\%$) for interaction surfaces of the order of one cm$^2$.

If ($\alpha.i$) = 1 mW, i = 20 mW and Ip = 1 W with I = 1.02 W. This approach enables a projection on a screen of the order of 10 m$^2$. In the standard approach, all that would be available would be a power value of the order of 500 mW, which would be barely sufficient for projection on a screen of 1 m$^2$.

It should also be noted that in the standard approach, where a large part of the illumination beam is intercepted by the liquid crystal cell, there is a risk that this cell will get deteriorated by the fact of substantial heating when a high power laser is used to compensate for the low light efficiency of the system.

The system of the invention therefore further enables possible problems of the heating of the liquid crystal to be resolved.

In the two cases referred to further above, the power values required for the lasers are compatible with those of existing lasers, namely argon or krypton lasers as well as doubled Nd:YAG lasers. The development of pumping technologies by power laser diodes, solid lasers of the ND:YAG type should also enable the making of laser sources with high efficiency and long life at low cost and with simplified service operations.

For the projection of moving pictures at television rates, it is important for the response time of the photorefractive material used to be appropriate. The response time of BSO is of the order of 20 msec and is therefore compatible with the application envisaged. BaTiO$_3$ can also be used. It enables a total energy transfer and a response time that depends on the power density. If there are to be response times compatible with a television rate, it is necessary to have high power density values, of the order of one to some Watts/cm$^2$, which corresponds to the magnitudes envisaged here above.

The device of FIG. 1 also includes devices enabling the system of the invention to be made more compact. These are notably reflection devices 6, 7 and 10 enabling the light beams to be sent in appropriate directions.

A divergent lens 12 enables the beam F1 to be distributed on the entire surface of the spatial modulator 1. A focusing lens 8 enables the focusing of the modulated beam FM on the optical center of the lens 5 so as to collect the maximum energy in the objective.

Besides, a polarization controller such as a half-wave plate or a combination of a half-wave plate and a quarter-wave plate is placed on the path of the pump beam F2, enabling the transmission of a pump beam F2 with a polarization adapted to the photorefractive crystal 2.

To obtain a quality projection, it is necessary to remove the problems of noise which may be observed in experiments of amplification in photorefractive materials due to the amplification of the parasitic scattered light and to internal reflections. The noise can be reduced by a slight rotation of the photorefractive crystal during the interaction as described in the French patent application No. 89 06344 filed on May 16, 1989.

Figure 3:
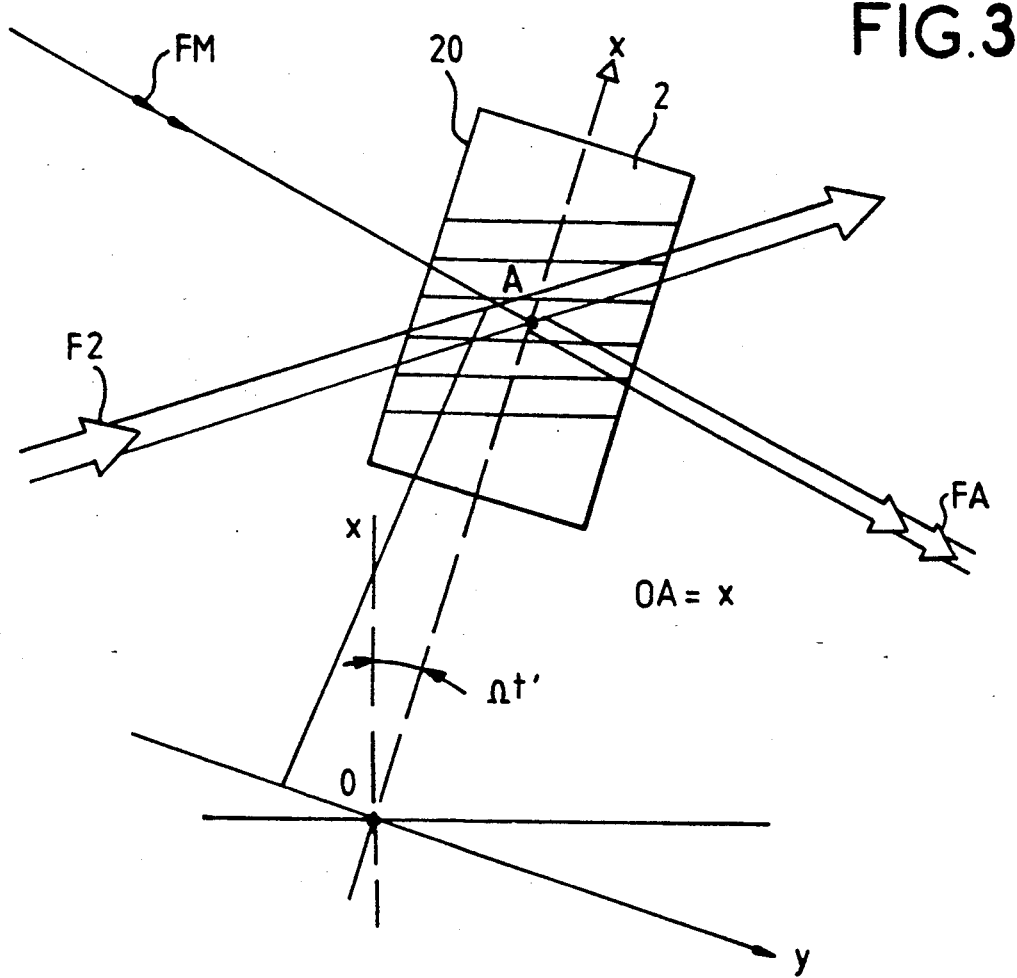
FIG. 3 shows a device providing for a shifting of the non-linear medium.

The modulated beam FM to be amplified interferes with the pump beam F2 in the non-linear medium 2 (photorefractive crystal). To reduce the noise considerably or even remove it, therefore, the establishment of the noise generating interferences is prevented by moving the non-linear medium by rotation about an axis. FIG. 3 shows an arrangement such as this. The photorefractive crystal 2 receives the modulated beam FM and the pump beam F2 in an appropriate angle. According to the invention, as shown in FIG. 3, the crystal 2 receives both beams by one and the same face 20.

Means (not shown) associated with the photorefractive medium 2 enable this medium to be made to oscillate about a mean position about an axis 0 in such a way that the input face 20 of the photorefractive crystal rotates with respect to the modulated beam and the pump beam.

Furthermore, in order that the movement of the crystal may enable the disturbing of the establishment of the interferences in the crystal, provision will be advantageously made for the axis 0 to be located outside the crystal and preferably at a distance substantially equal to the height of the crystal as shown in FIG. 3.

It can be concluded from the observation of the amplified signal and of the amplified noise that the speed of movement of the crystal should be sufficient to affect the amplification of the noise but smaller than a limit value to have only very little effect on the mechanism of gain on the modulated beam which gets established far more quickly.

It has been noted that, since the time constant for the establishment of the interference networks corresponding to the noise is far longer than that corresponding to the signal, a rotation of the order of one degree per second is sufficient to gain a major factor in signal-to-noise ratio (experimentally, a factor of 10 has been demonstrated) and obtain an amplified noiseless image. The projection device proposed should greatly benefit from this possibility. The possible slight shifting of the image on the screen which could result from this alternating movement of the crystal may be easily compensated for by an appropriate optical system. This system is constituted, for example, by a plate with parallel faces oscillating in the reverse direction with respect to photorefractive crystal 2 and having substantially the same refraction index as the crystal 2.

At each instant, the crystal 1 and the plate with parallel faces have symmetrical positions with respect to a direction perpendicular to the direction of propagation of the modulated beam FM. Thus, the modulated beam FM and the amplified beam FA are always substantially colinear.

The trichromatic projection may be obtained from three independent systems similar to the one described. It makes it necessary to have photorefractive crystals available with similar properties in the blue, green and red. Today, BaTiO$_3$ type crystals work well in the green and blue-green. By contrast, they are slightly less sensitive in the red. An optimization of the dopings enables this drawback to be overcome.

Figure 4:
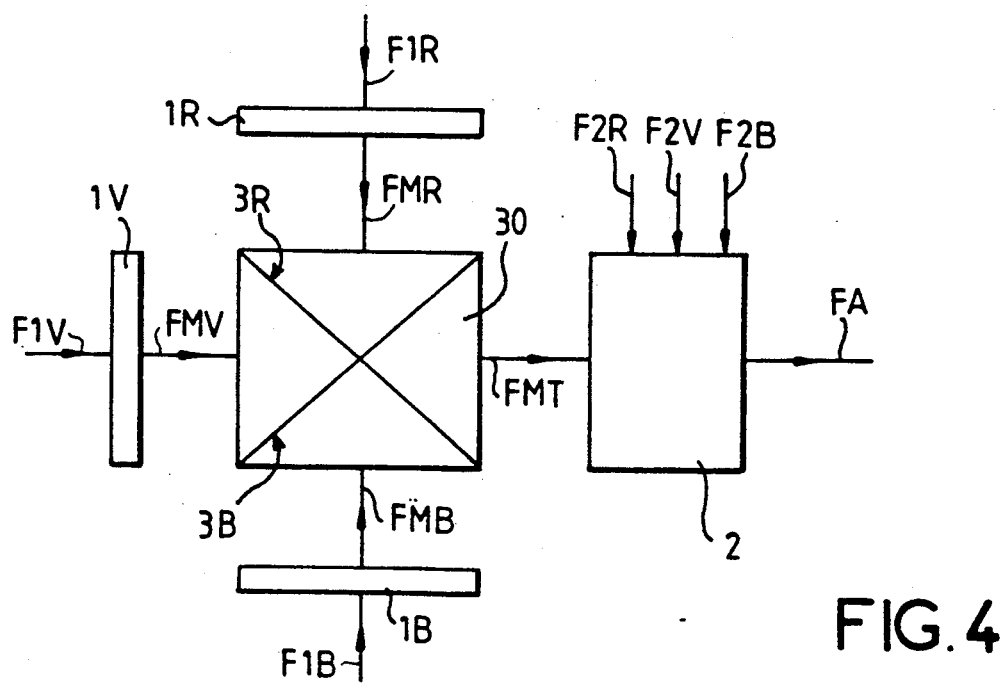
FIG. 4 shows a system according to the invention applied to a trichromatic projection.

In this case, the three beams corresponding to the three colors (red, blue, green) are processed spatially by spatial modulators. An arrangement such as the one shown in FIG. 4 is used for example. The three beams red (F1R), green (F1V) and blue (F1B) are processed by spatial modulators 1R, 1V, 1B. The modulated beams FMR, FMV, FMB are transmitted to a dichroic cube. The face 3R of the cube reflects the red beam FMR. The face 3B reflects the blue beam FMB. The green beam FMV goes through the cube without reflection. The three beams are therefore combined into a single beam FMT which is amplified as above in an energy transfer device 2 to give an amplified beam FA. For the energy transfer, the device 2 receives three pump beams F2R, F2V, F2B that correspond to the three colors red, green, blue and are given preferably by the same light sources which have given the beams F1R, F1V, F1B.

Figure 5:
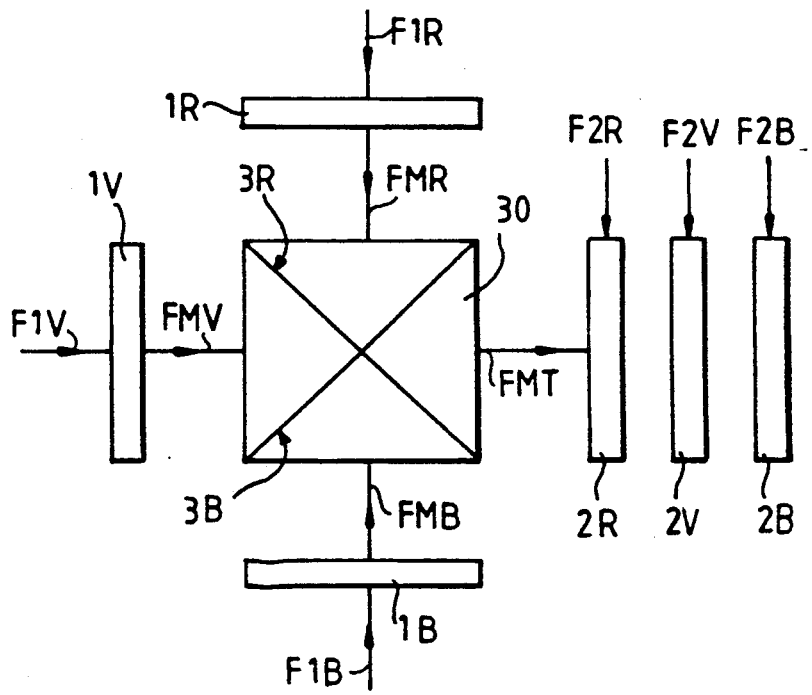
FIG. 5 shows a variant of the system of FIG. 4.

It is also possible to set up the system of the invention by using two or three photorefractive crystals placed in series instead of the photorefractive crystal 2. FIG. 5 shows an arrangement such as this where each crystal 2R, 2V, 2B the amplification of only one beam of only one wavelength and is transparent to the other wavelengths.

The crystal 2R therefore receives the pump beam F2R (red) and enables the amplification of the red component of the beam FMT. It is transparent to the green and blue components of the beam FMT.

The working of the crystals 2V and 2B is similar for the green and blue components respectively.

Figure 6:
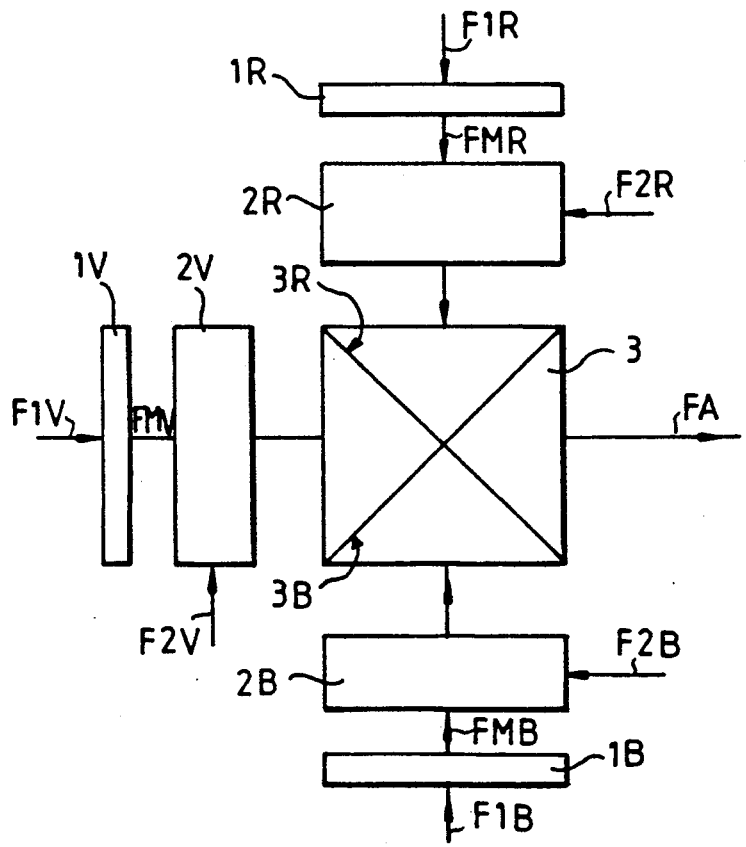
FIG. 6 shows another system according to the invention applied to a trichromatic projection.

As shown in FIG. 6, it is also possible to associate an energy transfer device 2R, 2V, 2B with each spatial modulator 1R, 1V, 1B and to recombine the three modulated beams only after modulation.

The system of the invention can be applied to a system that includes only one spatial modulator. In this case, the rays coming from the three lasers would be focused, by means of the matrices of lenses or holograms, on the different pixels so as to obtain the equivalent of an alternation of red, green and blue pixels.

The amplification could be achieved by applying the arrangements of FIGS. 4 or 5.

It is clear that the above description has been given purely by way of an example. Other variants may be contemplated without going beyond the scope of the invention. In particular, the nature of the spatial modulators as well as that of the energy transfer devices (or amplification device) may be different from that indicated here above.

What is claimed is:

1. A system for the display of images comprising:
   a spatial modulator of light receiving a first light beam and retransmitting a modulated beam;
   an energy transfer device receiving the modulated beam and a second light beam and transferring the energy from the second light beam towards the modulated beam; and
   a focusing lens placed in the path of the first beam and focusing the modulated beam on the optical center of a projection objective.

2. A system according to claim 1, wherein the spatial modulator is a liquid crystal device.

3. A system according to claim 1, wherein the energy transfer device is a photorefractive crystal.

4. A system according to claim 1, wherein the first light beam and the second light beam are polarized by a single polarization means.

5. A system according to claim 4, wherein the first and second light beams are provided by a same light source and wherein a separation device separates the beam given by this source into a first low-intensity beam and a second high-intensity beam.

6. A system for the display of images, comprising:
   a spatial modulator of light receiving a first light beam and retransmitting a modulated beam;
   an energy transfer device receiving the modulated beam and a second light beam and transferring the energy from the second light beam towards the modulated beam; and
   means to shift the position of the energy transfer device with respect to the modulated beam.

7. A system according to claim 6, wherein the shifting means enable the energy transfer device to be made to rotate with respect to a fixed axis.

8. A system according to claim 7, comprising a plate with parallel faces that rotates with respect to the fixed axis in the reverse direction of the rotation of the energy transfer device.

9. A system for the display of images comprising:
   a spatial modulator of light receiving a first light beam and retransmitting a modulated beam;
   an energy transfer device receiving the modulated beam and a second light beam and transferring the energy from the second light beam towards the modulated beam;
   several spatial modulators of light, each receiving a light beam of a particular wavelight, and energy transfer device associated with each spatial modulator receiving a beam modulated by the spatial modulator and a pump beam and giving an amplified modulated beam, a beam combination device receiving the amplified modulated beams given by the energy transfer devices and giving a combined beam.

10. A system for the display of images comprising:
    a spatial modulator of light receiving a first light beam and retransmitting a modulated beam;
    an energy transfer device receiving the modulated beam and a second light beam and transferring the energy from the second light beam towards the modulated beam;
    several spatial modulators of light modulating beams of determined wavelengths, a beam combination device receiving the beams modulated by the modulators and giving a combined beam, an energy transfer device receiving the combined beam and a pump beam containing one of said wavelengths and several beams having said wavelengths.

11. A system for the display of images comprising:
a spatial modulator of light receiving a first light beam and retransmitting a modulated beam;
an energy transfer device receiving the modulated beam and a second light beam and transferring the energy from the second light beam towards the modulated beam;
several spatial modulators of light each receiving a light beam of a particular wavelength, a device for the combination of beams receiving the modulated beams given by the modulators and giving a combined beam, several energy transfer devices placed in series on the combined beam, each receiving a pump beam of one of said wavelengths, each energy transfer device enabling the amplification of one or more wavelengths and being transparent to the other wavelengths.

12. A system for the display of images comprising:
a spatial modulator of light receiving a first light beam and retransmitting a modulated beam;
an energy transfer device receiving the modulated beam and a second light beam and transferring the energy from the second light beam towards the modulated beam;
spatial modulator receives at least three beams of different wavelengths, these three beams being focused on three different modulation elements of the spatial modulator so that they can be modulated differently, the three modulated beams being then transmitted to one or more common amplication devices.

* * * * *

UNITED STATES PATENT AND TRADEMARK OFFICE
CERTIFICATE OF CORRECTION

PATENT NO. : 5,206,674

DATED : April 27, 1993

INVENTOR(S) : Claude Puech et al.

It is certified that error appears in the above-identified patent and that said Letters Patent is hereby corrected as shown below:

On the title page, Item [75],

The fourth inventor's name is spelled incorrectly, should read:

--Henri Rajbenbach--

Signed and Sealed this

Thirtieth Day of November, 1993

Attest:

BRUCE LEHMAN

Attesting Officer

Commissioner of Patents and Trademarks